United States Patent [19]

King

[11] 3,737,514

[45] June 5, 1973

[54] EXTRACTION OF ALUMINA FROM ORES

[75] Inventor: William R. King, Cupertino, Calif.

[73] Assignee: Kaiser Aluminum & Chemical Corporation, Oakland, Calif.

[22] Filed: Oct. 5, 1970

[21] Appl. No.: 78,175

[52] U.S. Cl. .................... 423/121, 423/84, 423/85, 423/140
[51] Int. Cl. .......................... C01f 7/06, C01f 7/34
[58] Field of Search .................. 23/143; 423/121

[56] References Cited

UNITED STATES PATENTS

| 663,167 | 12/1900 | Hall | 23/143 |
|---|---|---|---|
| 1,826,895 | 10/1931 | Muller et al. | 23/143 X |

FOREIGN PATENTS OR APPLICATIONS

| 3,195 | 7/1879 | Great Britain | 23/143 |

OTHER PUBLICATIONS

Edwards, "The Aluminum Industry," Vol. I, pages 63–66, 71–73 (1930).

Primary Examiner—M. Weissman
Attorney—Paul E. Calrow, Harold L. Jenkins and Andrew E. Barlay

[57] ABSTRACT

Alumina in increased yeild is recovered from aluminiferous ores containing titanium and also iron in goethite phase by subjecting the ores to a wet caustic digestion step at temperatures in excess of about 280°C in admixture with a calcium compound added in an amount at least sufficient to convert substantially all of the titanium to a calcium-titanium compound for a time sufficient to accomplish the conversion of goethite to hematite followed by conventional alumina recovery steps.

8 Claims, No Drawings

EXTRACTION OF ALUMINA FROM ORES

BACKGROUND OF THE INVENTION

This invention relates to a process for the recovery of caustic-soluble alumina values from aluminiferous ores. More particularly, it concerns a digestion process for aluminiferous ores containing titanium and also iron in the goethite phase with a calcium compound to obtain caustic-soluble alumina in increased yield.

Alumina values can be recovered from aluminiferous ores in various ways. One widely utilized process is the well known Bayer process which involves digestion of the aluminiferous ore in a caustic solution at temperatures between 200°–255° C. The digestion results in a caustic aluminate solution and a caustic-insoluble residue commonly called "red mud." In the usual Bayer process the caustic aluminate solution is separated from the red mud and subjected to precipitation to enable recovery of the alumina values. The red mud, which also contains occluded or trapped caustic-soluble alumina values, is generally washed to remove most of these values from the mud in order to improve the yield of the Bayer process.

In many instances the red mud will contain considerable quantities of alumina which under the conditions of the Bayer process is unavailable to the caustic extraction process and constitutes unrecoverable values. Additionally, many aluminiferous ores when subjected to the wet caustic extraction of the Bayer process yield a red mud of extremely fine particles size, usually less than 10 micron an often less than one micron. This red mud is hard to settle, and the washing of this type of mud becomes time consuming and expensive. This is particularly true for those aluminiferous ores which contain a portion of their iron content in the goethite phase.

Goethite [(FeO)OH] is commonly associated with diaspore, an alumina-containing mineral, and it is believed that some of the Al atoms are within the lattice structure of goethite. The combination of goethite-diaspore can be frequently found in Jamaican bauxites; however, there are many other bauxite sources, for example, Greece, Hungary, South America, which exhibit this type of combination of the iron and aluminum constituents.

It has also been found that unless the goethite is transformed to a different iron phase during the wet caustic digestion, for example, to hematite, the goethite lattice bound alumina will not be available for caustic extraction.

The goethite content of the aluminiferous ores may vary between a few percent and up to about 90 percent by weight of the iron content of the ore. Although the alumina values bound in the goethite lattice may be as low as about 0.1 percent by weight of the total alumina of the ore, more frequently, values in the range of about 2–3 percent by weight are found and, in exceptional instances, values as high as 8–10 percent by weight can be encountered. This lattice bound alumina, unless made available to the caustic extraction process, will become lost in the red mud, causing a commerically significant reduction of yield even if the lattice bound alumina is only about 1.0 percent of the total alumina.

The following Table shows Jamaican bauxite samples containing iron in the goethite phase and the percentage of lattice bound alumina.

TABLE I

| Sample | Goethite Content Weight % Bauxite | Lattice Bound Alumina in Wt. % of Total Alumina |
| --- | --- | --- |
| 1 | 22.9 | 9.2 |
| 2 | 21.9 | 6.7 |
| 3 | 9.0 | 2.2 |

Conversion of the goethite phase to hematite can be accomplished, for example, by raising the temperature of the digestion to about 260°C, or above, which will aid the effect of the caustic on the goethite lattice, resulting in increased alumina yields. Commerically, a suitable method operating at temperatures in excess of 260°C and at elevated pressures associated with these temperatures is the so-called tube digester method. The digestion of the aluminiferous ores by this method is usually accomplished at temperatures in excess of 290°C and at high pressure in a long heated tube to assure sufficient residence time and allow good contact between the caustic and the aluminiferous ores. Thus, this type of digestion process allows the conversion of the goethite to other iron phases and the lattice bound alumina can be made available to caustic extraction. This process not only promotes the production of alumina in increased yield due to the alumina recovered from the goethite lattice but also results in a red mud which settles comparatively faster than the red mud obtained from the regular Bayer process. Consequently, the mud can be washed substantially free of caustic soluble alumina values with less difficulty.

The high temperature digestion process (usually in excess of 280°–290°C) is capable of extracting alumina values from aluminiferous ores containing a portion of their iron content in the goethite phase. However, it has been found that only a low degree of conversion of goethite to hematite occurs, even at these high temperatures and pressures if the aluminferous ore contains titanium, and thus only a small increase in the yield of caustic soluble alumina can be obtained. Even if the temperature of the digestion is raised to, for example, 350°C, only a slight increase in the goethite to hematite conversion can be observed in the presence of titanium. Consequently, the yield of alumina values from aluminiferous ores containing both goethite and titanium is considerably lower than yields obtained from ores devoid of titanium. Thus, for example, when high temperatures, i.e., in excess of 280°C are utilized for the digestion of goethite and titanium containing aluminiferous ores without employing added lime quantities, only about 20–30 percent of the lattice bound alumina can be recovered as caustic soluble alumina. With the process of the invention, up to about 70–90 percent of the lattice bound alumina will be converted to caustic soluble alumina. Similarly, if the entire digestion is accomplished at temperatures below about 260°C in the presence of a calcium compound, the goethite to hematite conversion in the presence of titanium will be insignificant, and conversion of only about 5–15 percent of the lattice bound alumina to caustic soluble alumina will be observed. Thus, it becomes evident that high temperatures associated with the addition of a calcium compound in sufficient quantity to titanium containing aluminiferous ores wherein a significant portion of the iron phase is goethite, results in a substantial and commercially significant increase in caustic soluble alumina.

Aluminiferous ores containing both goethite and titanium can be found at many locations throughout the world, and thus it becomes important to provide a process which allows recovery of the goethite lattice bound alumina from titanium-containing ores in order to improve the yields of the wet caustic extraction and render the extraction process more economical.

The following Table presents some typical bauxite compositions reproduced from "Extractive Metallurgy of Aluminum," Volume 1, Alumina. Interscience Publishers, 1963.

TABLE II

Analyses of Bauxites Derived from Various Types of Rocks

|  | 1 [a] | 2 [b] | 3 [c] | 4 [d] | 5 [e] | 6 [f] | 7 [g] | 8 [h] |
|---|---|---|---|---|---|---|---|---|
| $H_2O$ | 28.5 | 27.6 | 24.9 | 27.1 | 21.9 | 18 | 12.1 | 12.7 |
| $SiO_2$ | 5.7 | 5.1 | 8.6 | 6.5 | 8.3 | 6.3 | 2.8 | 1.7 |
| $Fe_2O_3$ | 9.2 | 14.2 | 20.3 | 5.8 | 15.4 | 18.8 | 24.2 | 20.4 |
| $TiO_2$ | 1.4 | 2.8 | 1.2 | 1.2 | 4.2 | 1.7 | 3.3 | 2.9 |
| $Al_2O_3$ | 55.3 | 50.3 | 45 | 59.4 | 49.1 | 34 | 56.5 | 60.9 |
| $P_2O_5$ |  |  |  |  |  | 13.2 | 0.8 |  |
| CaO |  |  |  |  |  | 6.7 | 0.1 |  |
| Total | [i]100 | [i]100 | [i]100 | [i]100 | 99 | 98.7 | 99.7 | 98.6 |

[a] Gibbsitic bauxite derived from nepheline syenite, Kassa, Guinea. Analyzed by Aluminuim Laboratories Ltd., Arvida, Canada.
[b] Gibbsitic bauxite derived from basalt, Fiji. Analyzed by Aluminium Laboratories Ltd., Canada.
[c] Gibbsitic bauxite derived from hornblende schist, Mackenzie, British Guiana. Analyzed by Demerara Bauxite Co. Ltd., Mackenzie, British Guiana.
[d] Gibbsitic bauxite derived from phyllite, Johore, Malaya. Analyzed by municipal analyst, Singapore.
[e] Gibbsitic bauxite derived from mica schist, Darling Range, Western Australia. Analyzed by Aluminium Laboratories Ltd., Arvida, Canada.
[f] Phosphatic gibbsitic bauxite derived from limestone, Fiji. Analyzed by Aluminium Laboratories Ltd., Arvida, Canada.
[g] Boehmitic bauxite derived from limestone, Istria, Yugoslavia. Analyzed by Aluminium Laboratories Ltd., Arvida, Canada.
[h] Diasporic bauxite derived from limestone, Distomon District, Greece. Analyzed by Aluminium Laboratories Ltd., Arvida, Canada.
[i] Alumina by difference.

It has now been discovered that alumina values can be recovered in increased yields from goethite-titanium containing aluminiferous ores by digesting the ore in admixture with an added calcium compound capable of combining with the titanium constituent of the ore generally as calcium titanate, the digestion being conducted in a caustic medium at temperatures in excess of about 280°C.

While the exact mechanism of the reactions taking place during extraction of alumina in the presence of calcium compounds from goethite-titanium containing ores is not known, it is believed, without being bound to any particular theory, that in the presence of titanium, iron present in the ore in divalent form, will be bound to titanium perhaps in the form of $FeTiO_3$. When the titanium is converted to calcium titanate, the divalent iron is believed to be available to catalyse the conversion of goethite to hematite, rendering the geothite lattice bound alumina available to the caustic extraction process, resulting in increased yields. Other theoretical considerations present themselves, but in any event the use of calcium compounds in accordance with the novel process of the present invention substantially reduces the deleterious effect of naturally present titanium on solubilization of alumina.

BRIEF SUMMARY OF THE INVENTION

A process for increasing the yield of caustic soluble alumina from aluminiferous ores containing titanium and a portion of the iron content in the goethite phase by caustic digestion comprising the steps of admixing the aluminiferous ore with an amount of a calcium compound at least sufficient to provide a calcium to titanium atomic ratio of 0.5 to 1, and with a caustic solution and treating the resulting slurry at temperatures in excess of about 280°C.

DETAILED DESCRIPTION OF THE INVENTION

The present invention relates to a process for the recovery of alumina from aluminiferous ores. More particularly, the present invention provides an improved process for the recovery of caustic soluble alumina in increased yield from titanium-containing aluminiferous ores.

For purposes of this invention, the expression "aluminiferous ores" refers to alumina-containing ores which, when subjected to a treatment with a caustic solution or liquor, yield alumina in the form of caustic aluminate. Representative but not limiting examples of the ores suitable for accomplishing the process of the invention include bauxite, diasporic clays and laterites.

The term "caustic solution or liquor" used hereinafter refers to a solution of sodium hydroxide or potassium hydroxide, sodium or potassium aluminate containing liquors such as the spent liquor obtained from the Bayer process or spent liquors concentrated by evaporation or by addition of caustic, or by both. Aluminiferous ores generally contain titanium in amounts from about 1 to about 5 percent by weight (calculated as $TiO_2$), and it is believed that during extraction a substantial portion of the titanium is a titanium-iron compound.

In the process of the present invention the titanium-containing aluminiferous ore is generally admixed with a calculated amount of calcium compound. it is also possible to admix the components during or after the preparation of an ore-caustic slurry. The calcium compounds suitable for the conversion of the titanium in accordance with the present invention include calcium oxide, calcium hydroxide in slurry form, calcium carbonate and other basic calcium components, either in dry form or as slurry. The ore can be predried to the desired moisture content, and if the ore is in large lumps, it is recommended to grind the ore. The amount of calcium compound added to the ore should be at least sufficient to allow conversion of at least a portion of the titanium to calcium-titanate. In other words, the amount of calcium present in the admixture (taking into consideration the calcium content of the ore, if any,) should be at least sufficient to establish an 0.5:1 calcium to titanium atom ratio, preferably an 0.8–1:1 calcium to titanium atom ratio. Aluminiferous ores usually contain quantities of other components which readily combine with calcium compounds. Such components include, for example, $P_2O_5$ etc., which can be present up to about 15–20 percent by weight of the ore. When the minimum amount of calcium compound necessary is to be determined, it is recommended that these calcium consuming components be taken into consideration to assure substantially complete conversion of the titanium to calcium titanate. The maximum amount to be added is dictated by the economy of the process; however, it is generally advantageous to admix the ore with a quantity of calcium, resulting in a 1:1 to 5:1 atom ratio of calcium to titanium.

In accordance with the teachings of the present invention, the bauxite-calcium compound admixture is slurried to make it suitable for the wet alkali extraction. The slurry is generally prepared by the addition of a caustic solution, and while caustic solutions of the type recited above are all suitable for the slurry preparation, for economy and expediency it is advantageous to utilize the spent liquor of the Bayer process for this purpose after its caustic content is adjusted by the addition of NaOH.

In order to accomplish a reasonably rapid conversion of the titanium compounds, the slurry should advantageously contain 150–250 grams per liter caustic soda expressed as $Na_2CO_3$ equivalent. Throughout the specification, the caustic soda concentrations are expressed in grams per liter and are reported as sodium carbonate, i.e., $Na_2CO_3$ equivalent. The expression "caustic soda" includes the caustic soda combined with the alumina as sodium aluminate and the free caustic soda in the solution. The weight ratio of $Al_2O_3$ to $Na_2CO_3$ is generally expressed as A/C and for the preparation of the slurry to be subjected to the novel first digestion step of the invention, A/C ratios of 0.35–0.70 are recommended.

The slurry thus prepared can be preheated, if desired, or heated in the digestion vessel. The novel digestion step is generally accomplished in pressure vessels capable of withstanding elevated temperatures and pressures employed by the process. Temperatures in excess of 280°C, generally between 280°–350°C, are utilized for this step, preferably between 280°–320°C.

Under these conditions, the titanium will be converted to calcium titanate and the lattice bound alumina will be rendered caustic soluble within a short time period, generally less than 30 minutes. Naturally, the rate of conversion of the titanium depends on the temperature utilized and the higher the temperature, the more rapid the transformation.

Subsequent to the first digestion treatment, the slurry can be cooled to the conventional Bayer process digestion temperatures, e.g., below 260°–255°C. The cooling can be accomplished in several ways, such as for example by admixture of the high temperature slurry either with water or with spent Bayer liquor. Combination of flash-cooling and dilution with, for example, spent liquor can also be utilized.

The predigested slurry is then further digested by the conventional Bayer process, if desired, by the addition of more caustic, and after completion of the second digestion step the slurry is utilized for the recovery of caustic soluble alumina values in a known manner.

It has been found that if first stage digestion temperatures between about 280°–320°C are utilized, conversion of goethite to hematite can be achieved with corresponding conversion of the titanium values to $CaTiO_3$ in less than 20 minutes, generally about 10–15 minutes. It has also been found that if the second digestion stage is conducted at temperatures below about 255°C, for example, between about 240°C and 255°C, time periods between 20–30 minutes suffice to dissolve the caustic soluble alumina from the ore. Thus, if a two-stage digestion process in accordance with the present process is utilized, total digestion time periods between about 30–45 minutes will provide the desired increase in caustic soluble alumina yields. Naturally, if the entire digestion process is carried out at temperatures in excess of about 280°C, also in accordance with the invention, total digestion times of about 20–30 minutes will allow recovery of alumina in increased yields.

It has been found that the short term, high temperature first digestion step not only allows recovery of alumina values in increased yield but also the red mud resulting from the combined first and second digestion step will possess better settling properties than the red mud of bauxite subjected only to the conventional Bayer process.

It has been found that when titanium-containing bauxites are subjected to the novel first digestion step in admixture with calcium compounds at the temperatures indicated above, the yield of recoverable caustic soluble alumina, i.e., total available alumina, increased generally by 1–3 percent over the yield obtained from bauxites not treated in accordance with the present process. Thus, it becomes evident that by utilizing the process of the present invention, the economy of the wet caustic alumina extraction process can be considerably improved without the necessity of carrying out the entire digestion process at temperatures in excess of 280°C, which not only requires significant capital expenditures but poses operating problems such as the maintenance of high pressure systems for extended periods, high temperature pumping systems, increased steam and heat requirements, etc.

The entire digestion process can be carried out at temperatures in excess of 280°C, for example, in a tube digester with the addition of a sufficient quantity of calcium compounds capable of converting the titanium to calcium titanate. The novel step of the present invention thus provides not only an advance over the known Bayer alumina production, but also improves the high temperature digestion processes which, while operating at temperatures in excess of 280°C, are incapable of recovering a significant portion of the lattice bound alumina in the presence of titanium without utilizing the novel process.

The first digestion step of the novel process can be accomplished either in a batchwise manner, or in a semi-continuous or continuous manner. In a continuous operation, for example, one digester can be utilized for the high temperature predigest, from which the predigested slurry can be continuously introduced into a digester operating at the conventional Bayer process temperature and pressure after the average residence time of the predigested slurry satisfies the requirement set for the conversion of the titanium to calcium titanate and of goethite to hematite.

The following illustrative examples further show the operation of the novel process without, however, being intended to limit the scope of the invention.

EXAMPLE I

A Jamaican bauxite originating from the South Coast of Jamaica was dried at 105°C for 2 hours and analyzed for constituents, with the following results:

Total $Al_2O_3$ = 48.05 % by wt.

$Fe_2O_3$ = 19.68 " " "

$SiO_2$ = 1.60 " " "

$TiO_{20}$= 2.63 " " "

$P_2O_5$ = 0.68 " " "

Loss of Ignition (LOI) = 26.44% (at 1000°C for 30 minutes), balance, metal oxides such as V, Ni, Mg, Cr, Cu and Zn.

The caustic soluble or total available (TAA) alumina amounted to 43.2 percent by weight as determined by caustic digestion in absence of CaO at 246°C. Lattice bound alumina was calculated to be 2.9 percent and the goethite content of the iron of the ore was found to be 21.9 percent.

The dried bauxite was ground to a particle size wherein at least 90 percent by weight passed through a screen having openings of 0.177 mm. 105 grams of the ground bauxite was admixed with 2.06 grams of finely ground CaO and slurried with a caustic solution containing 172 g/l caustic (calculated as g/l $Na_2CO_3$). The slurry had an alumina to caustic (A/C) ratio of 0.4. The slurry was then introduced into a high pressure Nickel 601 alloy autoclave and rapidly heated to 300°C and kept at this temperature for 30 minutes, then flashed to about 95°C and diluted to its original volume for settling. The red mud was separated from the liquor and after washing was analyzed. It was found that all of the iron in goethite phase was converted to hematite and from the residual alumina content of the mud, it was established that about 77 percent of the lattice bound alumina was extracted and made available for alumina production. Analysis of the red mud also showed that the substantial quantity of titanium was converted to calcium titanate. The overall alumina extraction yield was increased by about 5 percent.

EXAMPLE II

A sample of the same bauxite used in Example I was subjected to the same treatment as described in Example I, without the addition of CaO to the ground bauxite. The red mud resulting from the digestion was analyzed, with the following results. X-ray diffraction studies indicated that only a small fraction (less than about 20 percent by weight) of the goethite was converted to hematite. The alumina content of the red mud was determined, and it was found that only about one-third of the lattice bound alumina was converted and the total available alumina yield was substantially less. The titanium content of the red mud was found to be in the form of $FeTiO_3$.

What is claimed is:

1. An improved wet caustic process for the extraction of caustic soluble alumina values from bauxite ores containing titanium and wherein a significant portion of the iron constituent of the ore is in goethite (FeO.OH) phase which comprises:

a. subjecting the ore to a first stage digestion as a slurry in a caustic solution containing about 150 to 250 grams per liter caustic soda, calculated as $Na_2CO_3$, in admixture with a calcium compound selected from the group consisting of CaO, $Ca(OH)_2$ and $CaCO_3$, the amount of calcium compound added being in the range sufficient to establish a calcium to titanium atom ratio range of about 0.5 to 1, the digestion being carried out at temperatures from about 280°C to 350°C and for a time sufficient to convert substantially all of the goethite to hematite and to form calcium titanate thereby releasing lattice-bound alumina;
   b. subjecting the slurry from the first stage digestion to a second stage digestion at temperatures from about 200°C to about 350°C for a time sufficient to recover substantially all of the recoverable caustic soluble alumina from the ore; and
   c. separating the caustic soluble alumina from caustic insoluble residues and recovering the alumina values in an increased yield.

2. Process according to claim 1, wherein the second stage digestion is carried out at temperatures below about 255°C and in excess of 200°C.

3. Process according to claim 1, wherein the first stage digestion is accomplished at temperatures from about 280°C to about 320°C.

4. Process according to claim 1, wherein the first and second digestion steps are carried out at temperatures within the range of about 280°–350°C.

5. Process according to claim 1, wherein the calcium to titanium atom ratio is at least about 0.8 to 1.

6. Process according to claim 1, wherein the first stage digestion is accomplished in less than about 30 minutes.

7. Process according to claim 1, wherein the first and second stage digestion steps are accomplished in less than about 45 minutes.

8. Process according to claim 4, wherein the first and second digestion steps are accomplished in less than about 30 minutes.

* * * * *